Feb. 6, 1940.    J. W. LEIGHTON    2,189,651
ARM FOR INDIVIDUAL SUSPENSION
Filed Nov. 23, 1937    3 Sheets-Sheet 1

INVENTOR
John W. Leighton.
BY
Harness, Dickey & Pierce.
ATTORNEYS.

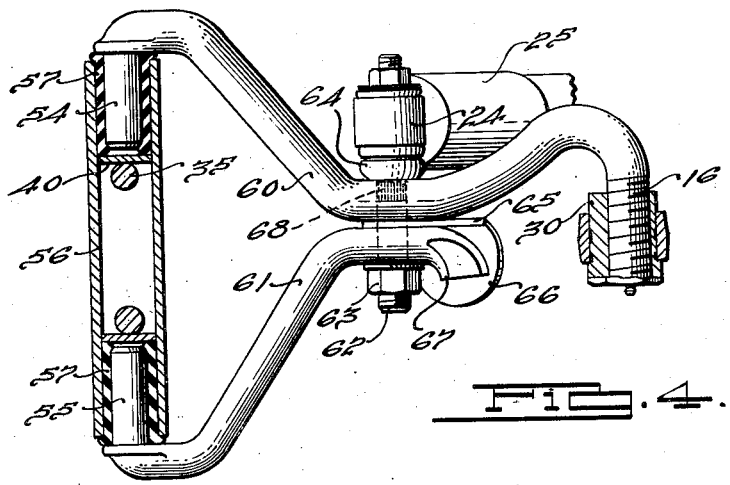
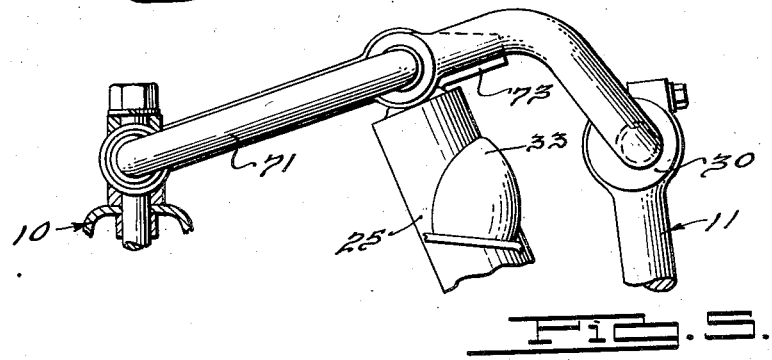
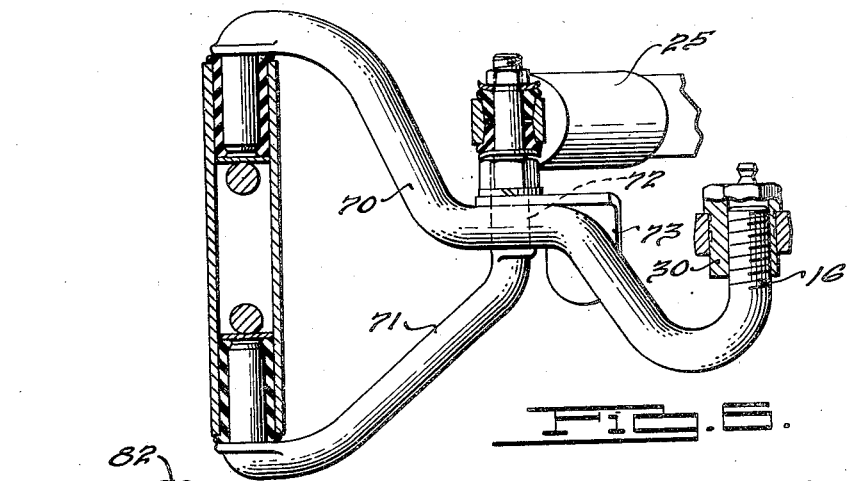

Feb. 6, 1940. J. W. LEIGHTON 2,189,651
ARM FOR INDIVIDUAL SUSPENSION
Filed Nov. 23, 1937 3 Sheets-Sheet 3
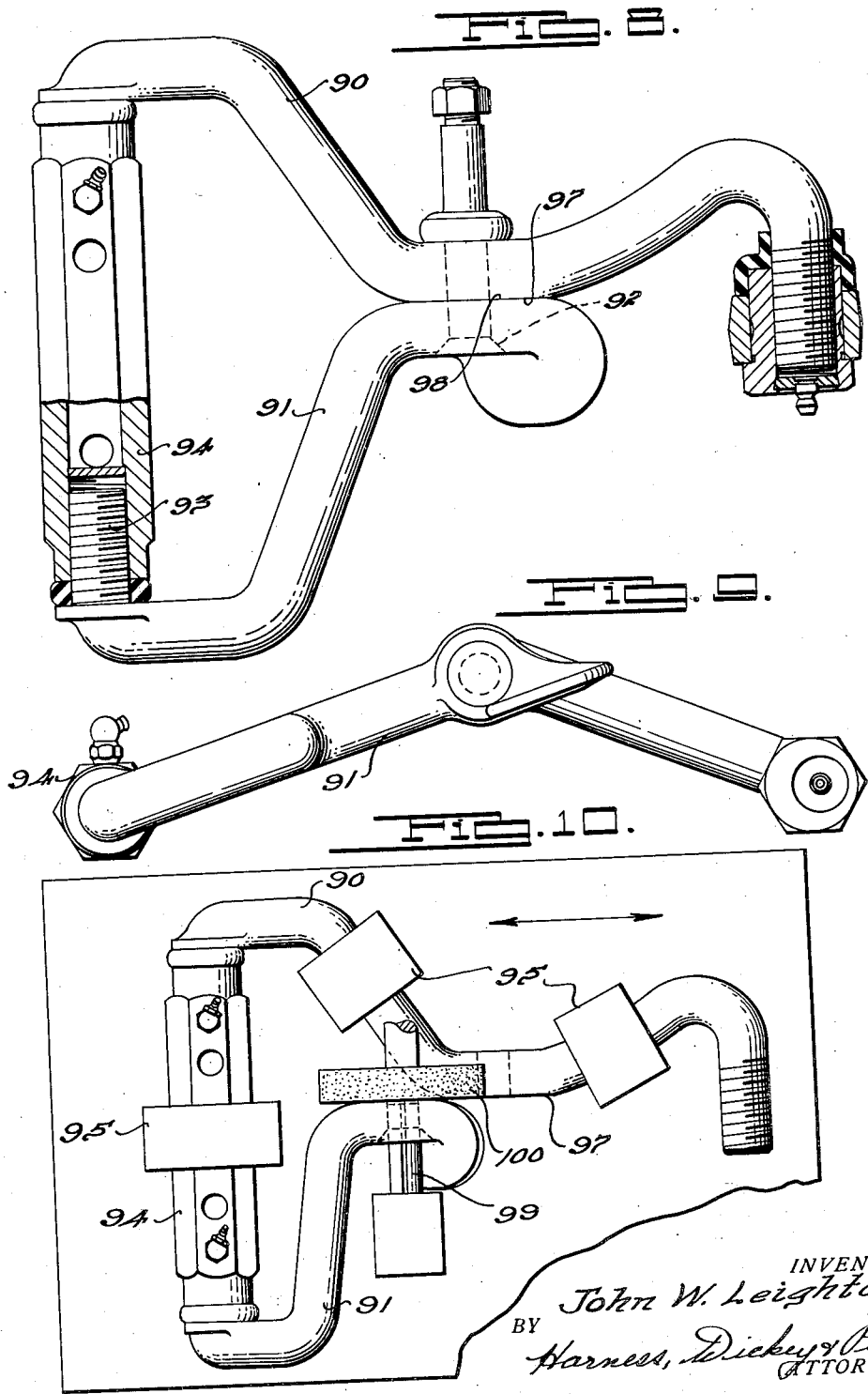

Patented Feb. 6, 1940

2,189,651

UNITED STATES PATENT OFFICE 2,189,651

ARM FOR INDIVIDUAL SUSPENSION

John W. Leighton, Port Huron, Mich.

Application November 23, 1937, Serial No. 176,087

15 Claims. (Cl. 267—20)

The invention relates generally to motor vehicles and it has particular relation to individual springing connecting the wheels to the frame of the vehicle.

One object of the invention is to provide an improved arm arrangement for connecting the wheel mounting member to the frame of the motor vehicle, which may be manufactured and assembled easily and inexpensively.

Another object of the invention is to provide a simple way of connecting two arm members together forming part of an individual springing and at the same time providing a means for connecting a shock absorber thereto.

Another object of the invention is to provide an improved arm arrangement wherein the arm arrangement is pivotally connected to the frame by means of a threader bearing which is inexpensive to manufacture, assemble and connect to the frame.

Another object of the invention is to provide improvements in individual springing for the purpose of providing a simple and efficient rubber connection between the arm and the frame.

Another object of the invention is to provide simple and efficient methods of assembling the arms of an individual springing wherein threaded bearings are employed, which will avoid binding in the threads.

Other objects of the invention will become apparent from the following specification, from the drawings to which it relates, and from the claims hereinafter set forth.

For a better understanding of the invention, reference may be had to the accompanying drawings, wherein.

Figure 2:
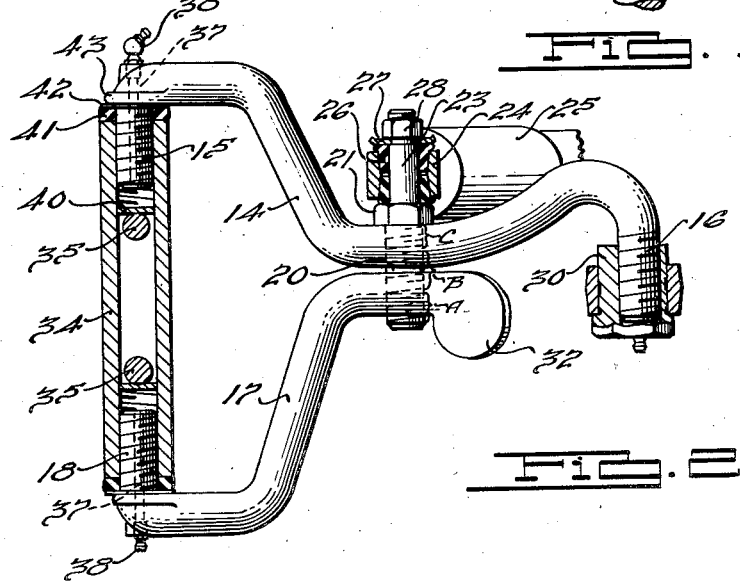
Fig. 2 is a plan view of the construction shown by Fig. 1 with certain parts shown in cross-section.

Fig. 4 likewise is a view similar to Fig. 2 illustrating still another form of the invention;

Figs. 5 and 6 are fragmentary elevational and plan views of still another form of the invention;

Fig. 7 shows a modified manner of securing a tubular member to the vehicle frame;

Figs. 8 and 9 are plan and elevational views illustrating a different upper arrangement;

Fig. 10 is a view illustrating a method employed in manufacturing the assembly shown by Fig. 8 so as to facilitate assembly and avoid binding in the threading bearings.

Figure 1:
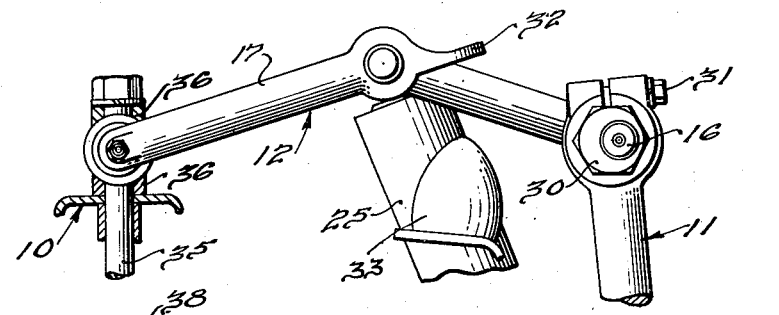
Figure 1 is a fragmentary elevational view illustrating an arm arrangement in an individual spring as constructed according to one form of the invention.

Referring to Fig. 1, the frame of the vehicle is indicated at 10, a wheel mounting member at 11, and an arm arrangement or linkage connecting the wheel mounting member to the frame is indicated at 12. Ordinarily, a second arm or linkage is pivoted to the frame below the arrangement shown by Fig. 1 and this second linkage is pivotally connected to the lower end of the wheel mounting member 11. It will be understood that an axle assembly projects laterally from the wheel mounting member and that the wheel is journalled on the axle. Also it will be understood that a coil spring will be provided between a portion of the frame and the lower linkage so that the frame is resiliently supported.

Now referring to Fig. 2, the arm arrangement comprises an arm 14 having an inner offset and threaded end 16. A second arm 17 forms part of the arm arrangement or linkage and likewise has an offset threaded inner end 18 but the outer end of this arm is rigidly connected to the arm 14 by means of a bolt 20 that is threaded through openings in both arms. This bolt has a head 21 abutting the outer side of arm 14 and an outer trunnion portion 23 connected to an eye portion 24 of a shock absorber 25. Rubber bushings 26 are disposed between the eye portion 24 and the trunnion 23 and the assembly is held in position by means of a washer 27 and a nut 28 on the bolt.

The threaded portion of the bolt 20 extending through the openings in arms 14 and 17 has three portions A, B, and C of different pitch diameters, the portion A being slightly smaller than B, and the portion B slightly smaller than C. As to the openings in the arms, the threaded opening in arm 17 is slightly smaller than that in arm 14 and the relation of the threaded bolt thereto is such that part A will freely thread through opening in arm 17, part B will thread freely through arm 14 but become tightly engaged in the opening in arm 17, and part C will become tightly engaged in the opening in arm 14. The bolt is turned to the position shown by using large turning forces and finally is locked in the openings. The offset outer end 16 of the arm 14 has pivotal threaded engagement with a bushing 30 and this bushing is adjustably clamped in the upper end of the wheel mounting member 11 by means of a bolt 31. It will be noted that the bushing 30 is of eccentric character so as to provide for camber adjustments. The arm 17 at its outer end is upset and flattened to provide a projection 32 adapted for engagement with a rubber buffer 33 on the vehicle frame so as to resiliently limit relative movement of the frame and arm.

For pivotally securing or connecting the arms 14 and 17 to the frame 10, a tubular member 34 is provided which is internally threaded at opposite ends for engaging the threaded ends 15 and 18 of the arms. It will be understood that the arms and tubular member 34 oscillate relatively during up and down movement of the frame 10 and that the relative turning movement occurs about threaded bearings. Bolts 35 passing vertically through openings in the tubular member and frame 10 secure the tubular member to the latter, and cylindrical spacers 36 fitting the member 34 may be used between the latter and the frame and the head on the bolt. Lubricant such as grease is injected into the threaded bearing and between the threaded surfaces through openings 37 in the threaded portions 15 and 18 of the arms and each arm at the outer end of said opening is provided with a grease fitting 38. Next to each bolt a disc 40 is closely fitted in the tubular member such as by a press fit and this fit serves to provide an end wall for the grease receptacle and to cause the grease to be forced reversely between the threaded surfaces. Likewise, these discs prevent lubricant from being forced out of the tubular member along the bolts. Rubber sealing members 41 are provided at the ends of the tubular member and it will be noted that a washer 42 engages the outer side of this sealing member and that the arm is upset as indicated at 43 so as to provide a desirable means for maintaining pressure against the rubber sealing means. During the necessary oscillatory movement of the arm with respect to the tubular member, it will be understood that the rubber sealing member is always in engagement with the end of the tubular member and the washer 42, although the sealing member is under more compression at one end of the oscillatory movement as compared to the degree of compression at the other end of the oscillatory movement.

The arms are assembled with the tubular member by threading each arm into the end of the tubular member separately until they are in the desired threaded position and then the openings in both arms for receiving the pin 20 are threaded. It will be appreciated that with the threaded ends 15 and 18 in position in the tubular member, threading of the opening in the arms for receiving the pin 20 causes the threads to be so formed that when the bolt 20 is threaded into the openings there is no tendency to move either arm longitudinally of the bolt.

Figure 3:
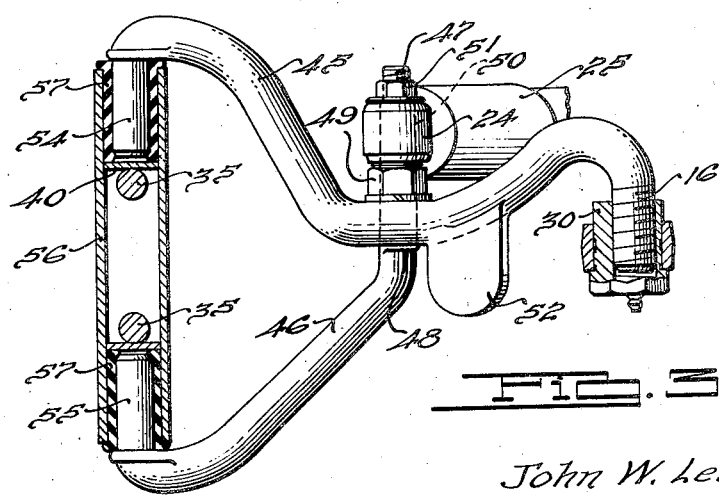
Fig. 3 is a view similar to Fig. 2 but illustrating another form of the invention.

In the construction shown by Fig. 3, arms 45 and 46 are provided which generally are arranged similarly to the arms 14 and 17 but in this case the arm 46 has a trunnion portion 47 which extends through an opening in the intermediate portion of arm 45 and is locked thereto by means of an upset head 48 on the arm and a nut 49. Outwardly of the nut 49 the trunnion 47 has a cylindrical portion 50 that is engaged with the arm portion 24 of a shock absorber such as that already described and a nut 51 outwardly of the arm portion 24 maintains the shock absorber in position. In this case the buffer engaging element comprises a projection 52 on arm 45 formed by upsetting the metal.

The inner ends of the arms are provided with smooth trunnion portions 54 and 55 that project into the ends of a tubular member 56 which is similar to the tubular member 34 except that it is not threaded at the ends. Rubber bushings 57 surround the trunnion portions 54 and 55 and may be vulcanized in place, or the rubber may be merely under compression. It will be noted in this case that while the washers 40 are provided, they are not to prevent lubricant or grease from escaping but are to limit the position of the rubber bushings. Oscillatory movement of the arms and the tubular member relatively in this case occurs through the rubber bushing as the bushings themselves would not turn ordinarily but will be maintained in contact with the surfaces of the trunnions and the tubular member.

In the construction shown by Fig. 4 arms 60 and 61 are provided and these are connected to the frame in the same manner as shown and described with respect to Fig. 3. The intermediate portions of the arm, however, are connected differently and in this case a pin 62 passes through openings in both arms and is locked thereto by means of a nut 63 on one end and an intermediate upset portion 64 engaging, respectively, the outer sides of the arms. An element 65 is disposed between the arms and has an opening through which the bolt passes, and this element has an upset outer end 66 for engaging the rubber buffer 33. It will be noted that the outer end of the arm 61 is upset as indicated at 67 and engages the buffer engaging portion 66.

Outwardly of the head 64 on the bolt, the shock absorber is mounted on the bolt in the same manner as previously described. It may be noted in this case that the bolt is serrated, as indicated at 68, so as to lock it tightly in place and prevent turning as relative oscillatory movement of the shock absorber and the arms occur.

In the arrangement shown by Figs. 5 and 6, arms 70 and 71 are provided and the arm 71 has a trunnion portion 72 which extends through the arm 70 and is locked thereto and connected to a shock absorber similarly to the manner described in connection with Fig. 3. In this case, the buffer engaging element is separate from the arm 70 and is fastened on the trunnion portion 72 and has a projection 73 for engaging the buffer 33, it being appreciated that this projection lies under the portion of the arm 70 so as to abut the same. The connection between the arm 70 and the arm 71 and the frame is the same as that shown by Fig. 4.

In Fig. 7, the tubular member which may be the tubular member of any of the previously described structures is secured to the frame by a bracket 80 at each end and each bracket is bolted to the frame on each side of the member. Each bracket has a curved portion 81 fitting the tubular member and is locked thereto so as to prevent rotation of the tubular member by a portion 82 pressed into an opening 83 in the tubular member.

It may be noted generally in connection with Figs. 2, 3 and 4, that the offset inner end and outer end of the longer arm extend in the same direction, whereas in the case of the longer arm shown by Figs. 5 and 6, the offset threaded outer end of the longer arm is turned oppositely to the offset inner end. It will be appreciated also that the shorter arm reinforces the longer arm and that the shape of the arms and the offset portions thereof provide for great strength and rigidity without requiring an expensive device or assembly. It will also be noted from the side elevational views that the shape of the arms is such as to provide increased strength laterally.

The construction shown by Figs. 8 and 9 is like that shown by Fig. 2 with certain exceptions. In the first place the arms indicated at 90 and 91 are riveted together in contact by a rivet pin 92 which also serves to support the shock absorber. Again, the inner ends of the arms have threaded trunnions 93 that are threaded into opposed ends of a bushing 94 which is hexagonal in shape. This bushing may be made from hexagonal bar stock that is drilled and threaded as will be readily understood.

In manufacturing this arrangement, the surfaces 97 and 98 of the arms 90 and 91 adjacent the rivet are made to contact each other with the threaded bearings in member 94 free from binding pressure such as might be produced if in setting the rivet the arms are pulled into contact. The fit between the arms is accomplished in the following manner.

First the arm 90 is assembled with the bushing 94 and the arm and bushing are then fixed in position by releasable jig fixtures 95 fastened on a slidable table having a definite path of movement. Then arm 91 is brought to approximately its desired position by rotating it to thread its trunnion 93 into the end of the bushing. It is possible in certain instances that the arms finally would swing into a position where the surfaces 97 and 98 would accurately come into contact but usually turning of the arm 91 would finally result in it striking arm 90 and while the arms could be sprung apart a slight amount to permit the surface 98 to slide over surface 97, this would put spring pressure in the arms and which in turn would put bending pressure on the threads. After arm 91 strikes arm 90, it is reversely turned a portion of a turn and then it is locked in position by an expanding mandrel 99 that engages the rivet opening in the arm and fixes it in position on the table. Then the table is moved past a grinding wheel 100 which grinds surface 98 sufficiently that when arm 91 is released from the mandrel, it may be turned to bring surfaces 97 and 98 into accurate and flush contact. It is apparent that the positions of the jig fixtures, mandrel and grinding wheel may be so determined that the desired amount of metal will be ground from surface 98 when the table moves past the grinding wheel.

Following the mating of surfaces 97 and 98, the arms are riveted as indicated previously.

All of the constructions are simple and may be assembled very readily. Moreover, the arms can be manufactured inexpensively from bar stock by sequential and efficient operations. Once assembled, the parts cannot be disassembled by oscillatory movement, thereby insuring safety in use. While all of the constructions illustrated relate to upper arm arrangements or linkages, it will be understood that the same arrangements may be applicable to the lower linkage if desired.

Although more than one form of the invention has been illustrated and described in detail, it will be apparent to those skilled in the art that various modifications may be made without departing from the scope of the appended claims.

What is claimed is:

1. In combination in a motor vehicle wheel suspension, a frame, a pair of arms having offset inner and threaded ends aligned axially, threaded bearing means on the frame receiving such threaded ends, means on the outer end of one of the arms for connecting a wheel supporting member thereto, and means connecting the arms between the latter means and the frame and also adapted to serve as a shock absorber connection.

2. In combination in a motor vehicle wheel suspension, a frame, a pair of arms having offset inner and threaded ends aligned axially, threaded bearing means on the frame receiving such threaded ends, means on the outer end of one of the arms for connecting a wheel supporting member thereto, and a threaded pin connecting the arms between the latter means and the frame and also adapted to serve as a shock absorber connection.

3. In combination in a motor vehicle wheel suspension, a frame, a pair of arms having their inner ends pivotally connected to the frame, means pivotally connecting the outer end of one of the arms to a wheel mounting member, the other arm having its outer end extending through an opening in said one arm, and means locking such end to the latter.

4. In combination in a motor vehicle wheel suspension, a frame, a pair of arms having their inner ends pivotally connected to the frame, means pivotally connecting the outer end of one of the arms to a wheel mounting member, the other arm having its outer end extending through an opening in said one arm and beyond the latter to provide a shock absorber connecting trunnion, and means locking said end to said one arm.

5. In combination, a vehicle chassis frame, arms projecting laterally of the frame for supporting a wheel mounting member and having their inner ends offset towards each other to provide trunnions disposed in axial alignment, a tubular member having its ends respectively receiving the offset ends of the arms, rubber between the offset ends of the arms and the wall of the tubular member for providing a resilient bearing engagement, bolts passing through the tubular member for fastening it to the frame, and a washer in the tubular member between each bolt and the end of the rubber surrounded offset end of the arm adjacent thereto.

6. In combination, a vehicle chassis frame, arms projecting laterally of the frame for supporting a wheel mounting member and having their inner ends offset towards each other to provide trunnions disposed in axial alignment, a tubular member having its ends respectively receiving the offset ends of the arms so as to provide a bearing for such ends, bolts passing through the tubular member between the offset ends of the arms, for fastening the tubular member to the frame, means for injecting lubricant between the bearing surfaces, and lubricant sealing means between the bolts and such bearings.

7. In combination, a vehicle chassis frame, arms projecting laterally of the frame for supporting a wheel mounting member and having their inner ends offset towards each other to provide trunnions disposed in axial alignment, a tubular member having its ends respectively receiving the offset ends of the arms to provide bearings for the latter, and means including an axial opening in such offset ends and extending to the arm surface externally of the tubular member for injecting lubricant to the bearing surfaces.

8. In combination in a motor vehicle wheel suspension, a frame, an arm projecting laterally from the frame and having its inner end offset longitudinally of the frame, a wheel mounting member connected to the outer end of the arm, and means pivotally connecting the inner offset end of the arm to the frame including a tubular bearing element receiving the offset end of the arm and a bolt element passing transversely through the tubular element and securing it to the frame.

9. In combination, a vehicle chassis frame, wheel mounting means including arm portions projecting laterally from the frame and having their inner ends bent to provide short, axially aligned but axially spaced trunnions, a relatively long tubular member into the opposite ends of which the trunnions project respectively, with the inner ends of the trunnions spaced substantially, and means for securing the tubular member to the chassis frame.

10. In combination, a vehicle chassis frame, wheel mounting means including arm portions projecting laterally from the frame and having their inner ends bent towards each other to provide short, axially aligned but axially spaced trunnions, a relatively long tubular member into the opposite ends of which the trunnions project respectively, with the inner ends of said trunnions spaced substantially, said trunnions having external threads and the tubular member having internal threads engaging the threads on the trunnions so as to provide threaded bearings, and means for securing the tubular member to the chassis frame.

11. In combination, a vehicle chassis frame, wheel mounting means including arm portions projecting laterally from the frame and having their inner ends bent to provide short, axially aligned but axially spaced trunnions, a relatively long tubular member into the opposite ends of which the trunnions project respectively, with the inner ends of the trunnions spaced substantially, rubber between the offset ends of the arms and the wall of the tubular member for providing a resilient bearing engagement, means at the inner end of each trunnion and forming a transverse wall in the tubular member for axially confining the rubber, and means for securing the tubular member to the frame.

12. In combination, a vehicle chassis frame, wheel mounting means including arm portions projecting laterally from the frame and having their inner ends bent to provide short, axially aligned but axially spaced trunnions, a relatively long tubular member into the opposite ends of which the trunnions project respectively, with the inner ends of the trunnions spaced substantially, and means located axially between the trunnions and extending diametrically through the tubular member for securing the latter to the frame.

13. In combination in a motor vehicle wheel suspension, a frame, a pair of arms having their inner ends offset or bent to provide axially aligned trunnions that are substantially separated in the axial direction, a unitary member fastened to the frame and having spaced apertured portions receiving the trunnions respectively, means on one of the arms for connecting it to a wheel support, and means interconnecting the arms between the wheel support and the unitary member so that the arms act as a unit.

14. In combination in a motor vehicle wheel suspension, a frame, a wheel support, an arm having parallel offset ends forming trunnions, a second and shorter arm having an offset trunnion end axially aligned with one trunnion of the first arm but spaced axially a substantial distance therefrom, means pivotally connecting said aligned trunnions to the frame, means connecting the arms substantially at the center of the first arm with the portions of the arms between their point of interconnection and the connections on the frame being substantially V shape, and means providing a trunnion for connection with a shock absorber substantially at the center of the first arm, the outer portion of the first arm outwardly of the interconnection between the arms being deflected or bent downwardly at a substantial angle to the inner part of such arm, said first arm between the frame and wheel support being directed in a direction generally diagonal to the pivotal axis of the connections at the opposite ends of the arms.

15. In an individual suspension, a tubular member adapted to be fastened to the vehicle frame and to have an oscillatory arm element journalled therein, said tubular member comprising steel bar stock polygonal in cross-section and which is bored to provide the journal opening, the shape of the member adapting the sides thereof to be fitted against flat surfaces on the frame.

JOHN W. LEIGHTON.